US007965644B2

(12) United States Patent
Chang et al.

(10) Patent No.: US 7,965,644 B2
(45) Date of Patent: Jun. 21, 2011

(54) ESTIMATING AVAILABLE BANDWIDTH AND ENHANCING NARROW LINK BANDWIDTH ESTIMATIONS IN TELECOMMUNICATIONS NETWORKS USING EXISTING USER TRAFFIC

(76) Inventors: Kirk K. Chang, Morganville, NJ (US); John M. Sucec, Piscataway, NJ (US); Harshad Tanna, Princeton, NJ (US); John Lee, Howell, NJ (US); Sunil Samtani, Piscataway, NJ (US)

( * ) Notice: Subject to any disclaimer, the term of this patent is extended or adjusted under 35 U.S.C. 154(b) by 0 days.

(21) Appl. No.: 12/781,971

(22) Filed: May 18, 2010

(65) Prior Publication Data
US 2010/0220629 A1 Sep. 2, 2010

Related U.S. Application Data

(63) Continuation of application No. 11/251,224, filed on Oct. 14, 2005, now Pat. No. 7,768,933.

(51) Int. Cl.
*H04J 3/14* (2006.01)
(52) U.S. Cl. ......................... 370/241; 370/252
(58) Field of Classification Search ................. None
See application file for complete search history.

(56) References Cited

U.S. PATENT DOCUMENTS

| | | | |
|---|---|---|---|
| 5,367,523 A | 11/1994 | Chang et al. |
| 6,421,720 B2 | 7/2002 | Fitzgerald |
| 6,839,754 B2 | 1/2005 | Nowak et al. |
| 7,016,373 B2 | 3/2006 | Wakayama et al. |
| 7,130,268 B2 | 10/2006 | Mascolo |
| 2005/0083849 A1 | 4/2005 | Rui et al. |
| 2005/0111487 A1 | 5/2005 | Matta et al. |
| 2006/0092850 A1 | 5/2006 | Neidhardt et al. |

OTHER PUBLICATIONS

Cheng, L. et al., "Accurate Bandwidth Measurement in xDSL Service Networks", Comp. Comm., 25(18), 2002, 1699-1710.
Dovrolis, C. et al., "What Do Packet Dispersion Techniques Measure?", Proc. of IEEE Infocom '01, Apr. 2001, 905-914.
McCann, C. J. et al., "A Measurement-Based Approach for Multi-level Admission of Heterogeneous Traffic in Wireless Ad-hoc Networks", Proc. IEEE MILCOM 2004, Monterey, CA, Oct. 31-Nov. 3, 2004.
Kapoor, R. et al., "Accuracy of Link Capacity Estimates Using Passive and Active Approaches with CapProbe", Proc. ISCC, 2004.

(Continued)

*Primary Examiner* — Kevin C Harper
(74) *Attorney, Agent, or Firm* — McDonnell Boehnen Hulbert & Berghoff LLP (57) ABSTRACT

Without using additional probing packets, estimates of the narrow link bandwidth and available bandwidth of a network path are computed based on existing traffic. The network can be of different types such as a wireless battlefield network context or a wired or wireless commercial network environment. "Fast packets", i.e. those packets which do not experience any queuing delay in the network, are identified. Fast packets are identified to resolve end-to-end packet delay into its constituent components (deterministic, transmission and queuing delays), estimate path utilization and eliminate the uncertainty (false alarms) that causes the prior art method to lose its effectiveness. An estimation algorithm computes end-to-end transmission delay and end-to-end deterministic delay of fast packets traveling along a path in a network. Examples of deterministic delay include satellite propagation delays and clock effects. Then, based on the results of the fast packet identifying algorithm, two logic branches are followed. A first branch calculates utilization and a second branch calculates narrow link bandwidth. The narrow link bandwidth is determined from the packet pair dispersion. The available bandwidth is obtained from the narrow link bandwidth and the utilization. Estimation of available bandwidth for an end-to-end network path allows traffic sources to judiciously regulate the volume of application traffic injected into the network.

38 Claims, 3 Drawing Sheets

OTHER PUBLICATIONS

Katabi, D. et al., "Inferring Congestion Sharing and Path Characteristics from Packet Interarrival Times", MIT Tech. Rep., LCS Technical Report, 2001.

Kazantzidis, M. et al., "Network Independent Available Bandwidth Sampling and Measurement", Proc. 2nd International Workshop on QoS-IP, Feb. 24-26, 2003, 117-130.

Lai, K. et al., "Measuring Bandwidth", Proc. IEEE Infocom '99, New York, NY, 235-245.

Nam, S.Y. et al., "Probing-Based Estimation of End-to-end Available Bandwidth", IEEE Comm. Letters, 8(6), Jun. 2004, 400-402.

Ribeiro, V. et al., "PathChirp: Efficient Available Bandwidth Estimation for Network Paths", Proc. PAM 2003, La Jolla, CA, Apr. 6-8, 2003.

Thompson, K. et al., "Wide-Area Internet Traffic Patterns and Characteristics", IEEE Network, Nov./Dec. 1997, 10-23.

ESTIMATING AVAILABLE BANDWIDTH AND ENHANCING NARROW LINK BANDWIDTH ESTIMATIONS IN TELECOMMUNICATIONS NETWORKS USING EXISTING USER TRAFFIC

CROSS-REFERENCE TO RELATED APPLICATIONS

This application is a continuation of U.S. patent application Ser. No. 11/251,224, entitled "Estimating Available Bandwidth And Enhancing Narrow Link Bandwidth Estimations In Telecommunications Networks Using Existing User Traffic," filed Oct. 14, 2005, now pending, which is fully incorporated herein by reference for all purposes.

GOVERNMENT LICENSE RIGHTS

This invention was made with Government support under DAAB07-01-C-L534 awarded by the US Army CECOM. The Government has certain rights in this invention.

FIELD OF THE INVENTION

The present invention relates to telecommunication networks and specifically to using existing user traffic for estimating the narrow link bandwidth (i.e., the capacity of smallest capacity link) of an end-to-end path and the available bandwidth (i.e., the amount of bandwidth remaining for additional traffic) along the path. Furthermore, in the process of estimating narrow link bandwidth and available bandwidth, the present invention provides a means to estimate path utilization and resolve end-to-end delay into its constituent components (i.e., deterministic delay, transmission delay and queuing delay).

BACKGROUND OF THE INVENTION

Estimation of available bandwidth for an end-to-end network path has potential application in both civilian and military environments. Available bandwidth (AB) is defined as the volume of unused link capacity on the tight link (i.e., link with the least "headroom") of an end-to-end path and represents the amount of additional traffic a given source can inject into the network without exceeding the link capacity of any given link in the path. Available bandwidth is distinguished from effective bandwidth (EB) which corresponds to the capacity of the narrow link (i.e., smallest capacity link) of the end-to-end path.

Estimation of available bandwidth for an end-to-end network path allows traffic sources to judiciously regulate the volume of application traffic injected into the network. For example, knowing when available bandwidth is small could be used by a source to preempt or deny low priority communication sessions in order to make more link capacity available for higher priority sessions that might otherwise experience degraded performance if congestion was allowed to build. Earlier bandwidth estimation techniques relied on active packet probing to estimate effective bandwidth. However, active packet probing in wireless mobile battlefield networks, for example, can be prohibitively costly in terms of consuming link resources. Furthermore, while packet probing can provide estimates of effective bandwidth, it does not necessarily reveal available bandwidth due to the effect of cross traffic that can not be measured directly.

In existing packet probing methods, back-to-back packets are injected into the network solely for the purpose of estimating the narrow link bandwidth with a significant level of uncertainty. Probing packet pairs are sent into the network, and the dispersion (the difference of arrival time at the destination) is analyzed.

There are major drawbacks and limitations to these packet probing methods. First, the method requires injecting probing packets into the network. Sending probing packets is considered unacceptable in many applications, such as wireless battlefield networks. Second, in the presence of cross traffic, packet probing techniques are effective only if a very large number of probe packets (in some cases, hundreds of packets) are injected into the network. That is, when probe packet techniques rely on isolated packet pair probes, then often the resulting bandwidth estimates will be erroneous due to the packet dispersion modulation effects of cross traffic. Third, previous packet probing techniques only estimate narrow link capacity and do not estimate available bandwidth.

In addition to packet probing methods, there is prior work that proposes means by which to detect shared narrow links but does not compute an actual estimate of available bandwidth. There is also some prior work that estimates available bandwidth, but the techniques of the present invention are distinguished from the earlier work due to their novel heuristics such as the application of fast packets. The techniques of the present invention are novel in that they additionally resolve end-to-end delay (T) into its constituent components: deterministic delay (D), queuing delay (W) and transmission delay (X).

The techniques of the present invention are based on end-to-end delay measurements that do not require active probing and are immune to clock offset. The present approach was initially developed for encrypted wireless networks with strict rules forbidding interactions across a cryptographic boundary between network routers and traffic sources (e.g., red-black networks). While the proposed techniques are described in conjunction with a wireless battlefield context, the techniques are also applicable in wired or wireless commercial networks.

SUMMARY OF THE INVENTION

The estimation of the narrow link bandwidth along a path as well as the estimation of the available bandwidth along the path between any two source points and destination points in a network is performed without the injection of any overhead traffic, for example, probing packets, into the network.

An estimation algorithm computes the deterministic delay of packets traveling along a path in a network. Examples of deterministic delay include satellite propagation delays and clock effects. Then, "fast packets", i.e. those packets that traverse the end-to-end network path without experiencing any queuing delay due to cross traffic, are identified. Based on the results of the fast packet identifying algorithm, two logic branches are followed. A first branch calculates utilization and a second branch calculates narrow link bandwidth. The utilization of the narrow link is estimated based on the fast packet count. The narrow link bandwidth is determined from the packet dispersion of naturally occurring packet pairs when the lead packet of the pair is identified as a fast packet. The available bandwidth is obtained from the narrow link bandwidth and the utilization.

In summary, without using additional probing packets, estimates of the narrow link bandwidth and available bandwidth are computed based on existing traffic. Fast packets are identified to reduce the uncertainty (i.e., estimation error) that causes the prior art method to lose its effectiveness in the presence of cross traffic.

The present invention will be more clearly understood when the following description is read in conjunction with the accompanying drawings.

DETAILED DESCRIPTION

Figure 1:
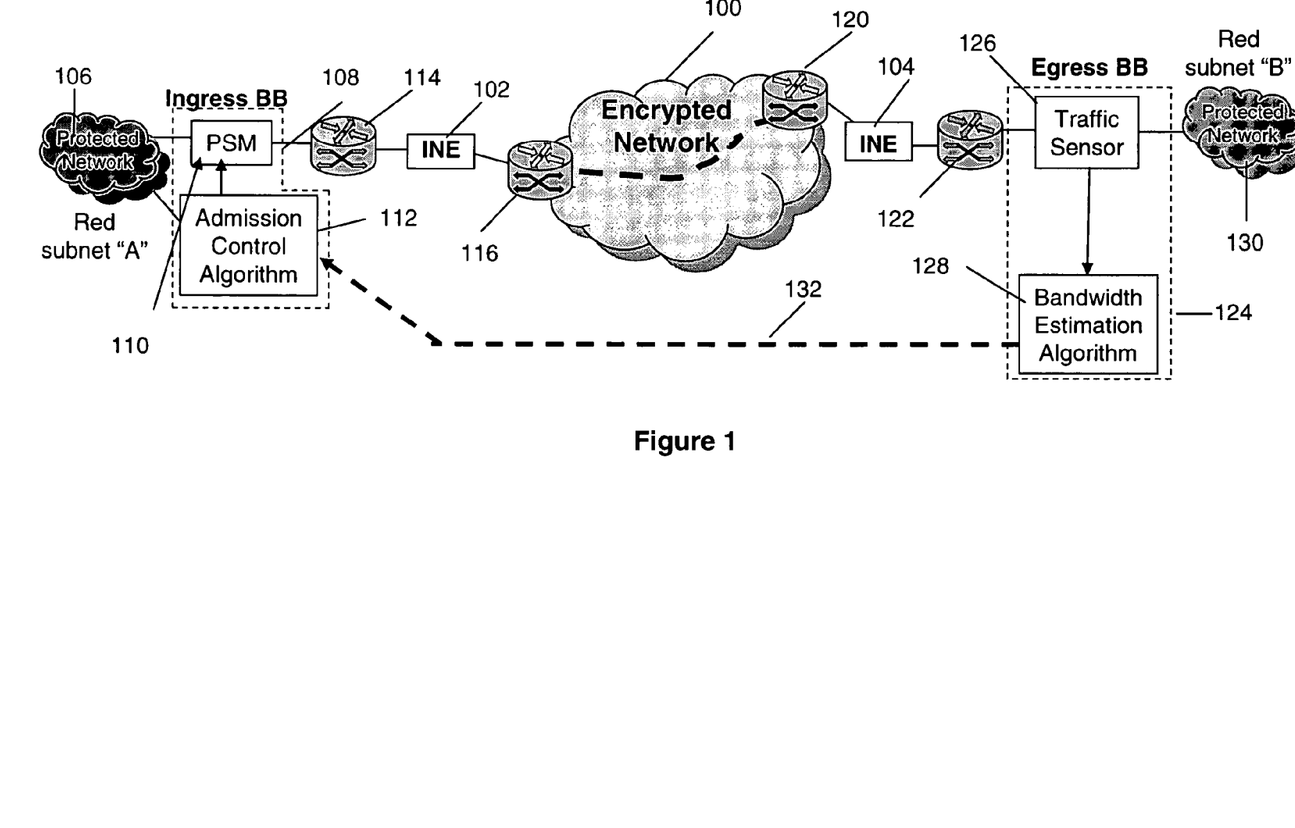
FIG. 1 is a schematic diagram of an edge-based bandwidth broker solution for QoS control in a battlefield network environment.

Referring now to the figures and to FIG. 1 in particular, there is shown a schematic diagram of an edge-based bandwidth broker (BB) solution for QoS control in a battlefield network. In FIG. 1 the wireless links of the encrypted wide area network 100 represent the scarce network resource. However, because of the cryptographic boundary formed by the inline network encryptor (INE) pair 102, 104 situated at the ingress and egress points of the wireless network, respectively, the source-destination pair is unable to directly measure the available bandwidth for the end-to-end path.

In operation, packets are transmitted from a first protected network 106 (Red subnet "A"), through an ingress bandwidth broker 108 comprising a policing-shaping-marking (PSM) function 110 where an ingress timestamp is written into an 8 byte option field of IP header and an admission control algorithm 112. Admission control algorithms are known to those skilled in the art.

Admitted packets pass through a router 114 (alternatively, depending on implementation, the router 114 may be absent) and inline network encryptor 102 to tunnel ingress point 116 and then through encrypted network 100. The packets exit the network via tunnel egress point 120 and travel through inline encryptor 104 and a router 122 into egress bandwidth broker 124. The egress bandwidth broker 124 comprises traffic sensor 126 and bandwidth estimation algorithm 128. The packets exiting the egress bandwidth broker 124 enter protected network 130 (Red subnet "B").

The available bandwidth, effective bandwidth and path utilization computed by bandwidth estimation algorithm 128 is provided to the admission control algorithm 112 of the ingress bandwidth broker 108. The path 132 represents logically the feedback loop formed by sending control packet from the egress bandwidth broker 124 to ingress bandwidth broker 108. The feedback signal along path 132 is via a black network tunnel through the encrypted network 100.

The strict segregation of control information on either side of the inline network encryptor (102 and 104), drives an edge-based solution for admission control and bandwidth estimation as shown in FIG. 1. The quality of service (QoS) decisions are based on admission control, policing-shaping-marking (PSM), traffic sensing and bandwidth estimation functions that are pushed to the edge of the network on the classified side of the inline network encryptor boundary. All of this functionality is collectively referred to as an edge-based bandwidth broker (BB).

FIG. 1 also shows how the functionality of the bandwidth broker is applied differently at the ingress and egress sides of a communication session. At the ingress side, the bandwidth broker is responsible for admission control (i.e., admission, denial and preemption of flows) and PSM. At the egress side, the bandwidth broker is responsible measuring traffic (e.g., packet count, packet length, packet delay) at the traffic sensor and for computing an estimate of available bandwidth based on the traffic measurements. The ingress-egress bandwidth broker pair form a feedback loop by having the egress bandwidth broker periodically send a control packet to the ingress bandwidth broker with an estimate of the available bandwidth for the end-to-end path. The estimate can then be used by a bandwidth broker-based admission control function at the ingress bandwidth broker that accepts, denies and preempts sessions based on the available bandwidth estimate computed at the egress bandwidth broker. FIG. 1 shows the insertion of an 8 byte time stamp field at the ingress bandwidth broker.

Figure 2:
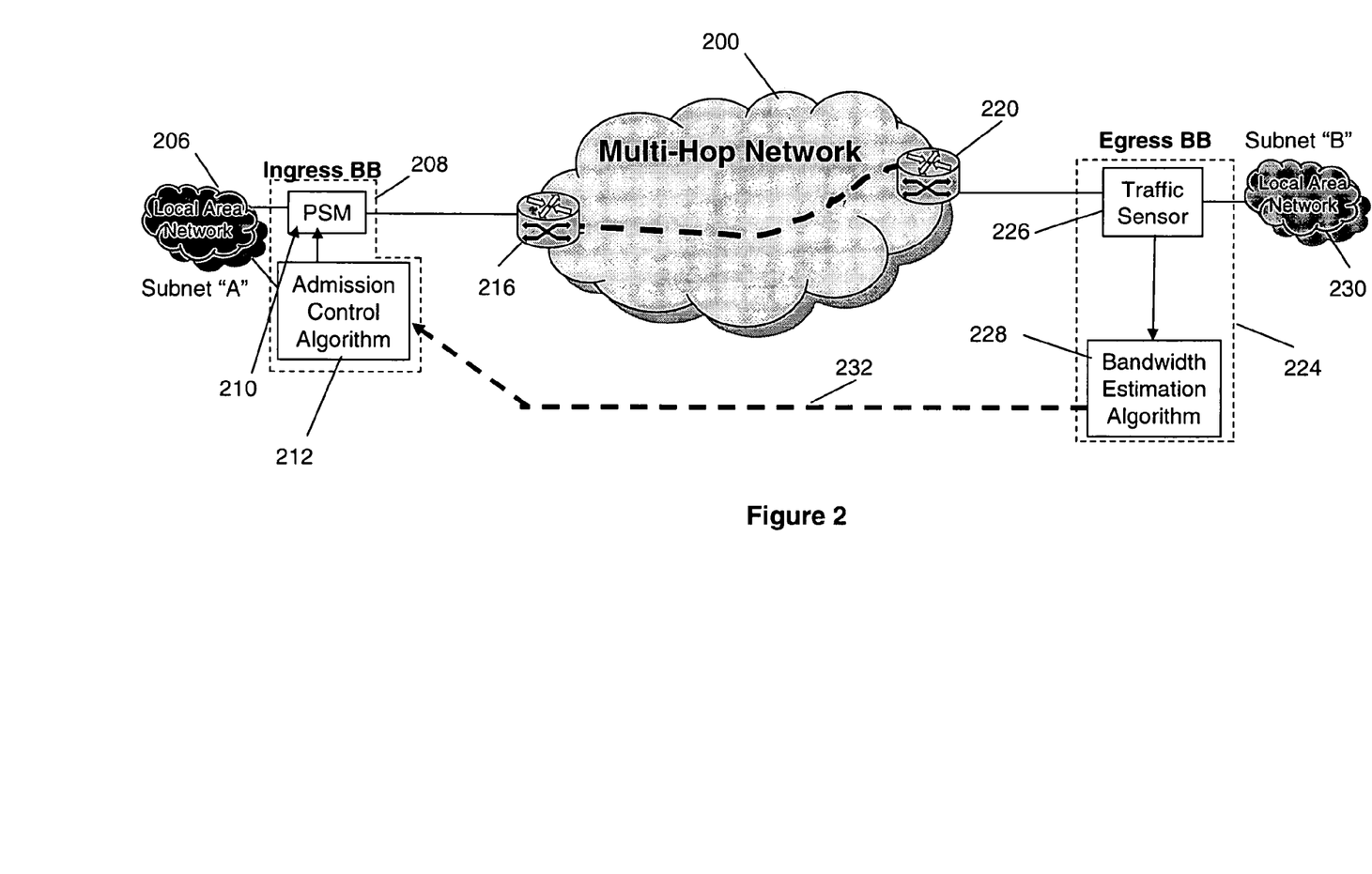
FIG. 2 is a schematic diagram of an edge-based bandwidth broker solution for QoS control in a commercial network environment.

FIG. 2 is similar to the arrangement shown in FIG. 1. The difference is that FIG. 2 shows an edge-based bandwidth broker (BB) solution for QoS control in a commercial (non-encrypted) network. In operation, packets are transmitted from a first local area network 206 (subnet "A") through an ingress bandwidth broker 208 comprising a policing-shaping-marking (PSM) 210 where an ingress timestamp is written into an 8 byte option field of IP header and an admission control algorithm 212. Admission control algorithms are known to those skilled in the art.

Admitted packets pass through a tunnel ingress point 216 and then through a multi-hop network 200. The packets exit the network via a tunnel egress point 220 and travel into egress bandwidth broker 224. The egress bandwidth broker 224 comprises a traffic sensor 226 and a bandwidth estimation algorithm 228. The packets exiting the egress bandwidth broker 224 enter local area network 230 (subnet "B").

The available bandwidth and effective bandwidth path utilization computed by bandwidth estimation algorithm 228 is provided along path 232 to admission control algorithm 212. The feedback signal along path 232 is fed via a reverse network path.

In order to generate an available bandwidth estimate, the end-to-end packet delay, packet length and ingress timestamp information is extracted from received packets at the egress bandwidth broker. This data is then applied to compute an estimate of available bandwidth without the need to inject probe packets. The approach, known as resource friendly bandwidth estimation (RFBE), comprises the following two core techniques: fast packet heuristics and packet dispersion analysis.

Fast Packet Heuristic

Received packet data provides a measurement of the end-to-end delay (T) for each packet (time when packet is received at the egress bandwidth broker−ingress timestamp). The measured value T comprises three disjoint components:

D≡Total end-to-end "deterministic" delay (e.g., propagation delay, clock offset processing delay)
W≡Total end-to-end queuing delay
X≡Total end-to-end transmission delay $$T=D+W+X \quad (1)$$

If the constituent elements of T can be isolated, then it is possible to obtain insight into the end-to-end path characteristics. For example, knowledge of W can indicate whether the received packet spent time waiting in router queues en route to the destination. This provides the egress bandwidth broker with insight into the path utilization.

To resolve T into D, W and X, RFBE applies a technique based on received fast packets. This technique is motivated by the observation that over the course of a communication session, there will be a fraction of packets that traverse the end-to-end network path without experiencing any queuing delay. That is, they arrive at intermediary routers when the router queues are empty. Such packets that experience no queuing delay are identified as fast packets and $W_{fast}=0$:

$$T_{fast}=D+X \quad (2)$$

Equation (2) consists of one known ($T_{fast}$) and two unknowns (D and X). Thus, there are two unknowns but only one equation. This is resolved by analyzing fast packets of different lengths.

Identifying Fast Packets

From equation (2) it is evident that fast packet end-to-end delay comprises two components, D and X. The transmission delay component X is a function of the hop-by-hop link capacity and the packet length (L). On the other hand, the deterministic delay component D is invariant in L. This suggests that among all packets of some length, for example, L=12000 bits (i.e., 1500 byte packet), a received 12000-bit packet whose end-to-end delay is minimum among all 12000 bits packet should be declared a 12000-bit fast packet. Similarly, a 320-bit packet (i.e., 40 bytes) whose end-to-end delay is minimum among all received 40-byte packets is declared a 320-bit fast packet.

It is not practical to identify fast packets for every possible packet length. Instead, RFBE exploits the fact that the distribution of packet lengths tends to be dominated by a small number of modes (e.g., 40 bytes—40%, 44 bytes—5%, 552 bytes—5%, 576 bytes—6% and 1500 bytes—10%). That is, the received packets at the egress bandwidth broker are sorted by length. From an array of sorted packets, the packet length modes (e.g., 40 bytes, 576 bytes and 1500 bytes) may be easily discovered and each received packet is assigned to a single bin associated with one of the packet length modes. Fast packets are then identified based on the packet with the minimum value of T for each of the bins.

Isolating Deterministic Delay and Transmission Delay

One consequence of equation (1) is that the clock offset contribution to D can produce very large values of T (e.g., on the order of hours or days) and even negative values for T (e.g., ingress clock is set to 3:00PM while egress clock is only 1:00PM). Further, large propagation delay contributions to D can (e.g., satellite links) result in D dominating the end-to-end delay measurement and obscure the effects of queuing delay and transmission delay. Thus, one of the important benefits of the RFBE fast packet heuristic is to eliminate the impact of clock offset and propagation delay by isolating the effect of D.

Recalling equation (2) and observing the fact that D is invariant in packet length, it is possible to use fast packets to form a second equation that will allow D and X of equation (2) to be resolved. As an illustration of this, a scenario where received packets are assigned to one of two bins is considered (i.e., a bin for small packets and a bin for large packets). The fast packets for small and large bins have the 2-tuples ($T_{fast,small}$, $L_{fast,small}$) and ($T_{fast,large}$, $L_{fast,large}$), respectively, where $$T_{fast,large}=D+X_{fast,large} \geq T_{fast,small}=D+X_{fast,small} \quad (3)$$

Defining $\beta$ as the end-to-end transmission delay per bit, the following demonstrates how to resolve transmission delay with only two fast packet measurements assuming that the fast packets have non-zero packet length differential (i.e., $L_{fast,large} > L_{fast,small}$):

$$\beta = \frac{X}{L} = \frac{(D+X_{fast,large})-(D+X_{fast,small})}{L_{fast,large}-L_{fast,small}} \quad (4a)$$

$$\Rightarrow \beta = \frac{T_{fast,large}-T_{fast,small}}{L_{fast,large}-L_{fast,small}} \quad (4b)$$

In general, if the packet length distribution is multi-modal, any pair of fast packet 2-tuples is sufficient for the application of equations (4a) and (4b). Having computed an estimate of $\beta$, it is straightforward to resolve the deterministic delay component by combining equation (4b) with any one of the fast packet 2-tuples ($T_{fast,Lfast}$):

$$D=T_{fast}-X_{fast}=T_{fast}-\beta \cdot L_{fast} \quad (5)$$

Combining equation (5) with equation (1) allows the effects of clock offset, propagation delay, etc. to be subtracted from the end-to-end delay, thereby, permitting subsequent processing on the queuing and transmission delay components of T.

Last, it is noted that the reciprocal of $\beta$ provides a lower bound ($B_{min}$) on the effective bandwidth of a path:

$$EB \geq B_{min} = \frac{1}{\beta} \quad (6)$$

For the cases where the end-to-end path comprises a single hop or where the end-to-end transmission delay is dominated by a single narrow link, the lower bound provided by equation (6) actually represents a close approximation for effective bandwidth, i.e., $EB \cong 1/\beta$.

Estimating Path Utilization

The occurrence of a fast packet represents an instance where a packet "sees" no cross traffic in its end-to-end path. This implies that the fraction of packets that are fast packets ($p_{fast}$) is correlated with the fraction of time that the path is not utilized. Hence, an estimate for the path utilization ($\rho$) may be computed as the complement of $p_{fast}$:

$$\rho=1-p_{fast} \quad (7)$$

The computation of $p_{fast}$ requires a means for determining whether a received packet with 2-tuple (T, L) is a fast packet. Using the identification above, "baseline" fast packets are selected from the set of bins to which received packets are assigned. However, for each packet received, a determination of whether it also is a fast packet must be made. For each received packet with 2-tuple (T, L), the RFBE adds one to the fast packet count if the following inequality is satisfied:

$$T-D<(1+\epsilon) \cdot \beta L, \text{ for a small constant } \epsilon > 0 \quad (8)$$

E.g., $\epsilon=0.1$. $p_{fast}$ is then computed by dividing the number of packets satisfying equation (8) for the current reporting interval by the total number of packets received for the reporting interval.

Packet Pair Dispersion

The application of packet dispersion techniques for estimation of narrow link capacity is considered. RFBE extends the earlier work in this area to provide reliable estimates of effective bandwidth by exploiting naturally occurring packet pairs in the traffic stream (i.e., "passive probing"). The effective bandwidth estimate is then combined with the utilization estimate computed by equation (7) to produce an estimate of available bandwidth.

Packet Pair Dispersion Overview

The essential idea of packet dispersion for narrow link capacity estimation is that (equal size) probe packets (i.e., packet pairs) are injected "back-to-back" into the network. Assuming that neither of the back-to-back packets experienced cross traffic, the difference in the end-to-end delay measurements ($\Delta=T_1-T_2$, where $T_1$ is the end-to-end delay of the lead packet and $T_2$ is the end-to-end delay of the second packet of the pair) is inversely proportional to the capacity of the narrow link (C). An estimate of C may be straightforwardly computed from $T_1$, $T_2$ and the received packet lengths (L):

$$\Delta = \frac{L}{C} = T_2 - T_1 \Leftrightarrow C = L/\Delta = \frac{L}{T_2 - T_1} \quad (9)$$

Again, instances of packet pairs that experience no cross traffic yield estimates of C that correspond to the true narrow link capacity. However, when one or both of the packets experience cross traffic, then equation (9) will yield an erroneous estimate of C. Thus, packet pair dispersion yields varying estimates of C depending on the effect of the cross traffic. In practice, a large number of packet pairs produce a narrow link capacity distribution of various modes. These modes fall into one of three categories:

1) Capacity Mode (CM): The true narrow link capacity.
2) Sub-Capacity Dispersion Range (SCDR): Range of modes corresponding to estimates below the CM.
3) Post-Narrow Capacity Modes (PNCMs): Modes corresponding to estimates that exceed the CM.

Exploiting Naturally Occurring Packet Pairs

A substantial fraction (approximately 15-20%) of TCP traffic is injected into the network back-to-back. This suggests that naturally occurring packet pairs in the received traffic stream may be used to estimate narrow link capacity via equation (9). RFBE compares the ingress timestamps of each pair of consecutively received packets. If the difference in the ingress timestamps is smaller than a predetermined threshold ($\delta$) and the lengths of the two packets are equal, then these two packets represent a back-to-back packet pair.

However, packet pairs may experience cross traffic which lead to erroneous estimates of effective bandwidth. To alleviate these effects, the following test has been devised for each packet pair:

Apply the end-to-end delay (T) and length (L) of the lead packet of the packet pair to the inequality of equation (8). If the inequality is satisfied, then the packet pair is accepted as a valid packet pair for estimation of narrow link capacity via equation (9). If the inequality is not satisfied, the packet pair is not used for estimating effective bandwidth.

The benefit of applying this rule is that it ensures the packet pair does not yield a post-narrow link capacity mode (PNCM). That is, the bandwidth estimate will not over-estimate the effective bandwidth. This improves the reliability of the narrow link capacity estimate.

Provided the received packet stream is sufficiently rich in naturally occurring packet pairs, RFBE obviates the need for active packet probing.

Available Bandwidth Estimation

Applying the RFBE fast packet-based packet pair test, packet pairs with dispersion ($\Delta$) that is at least L/C may be identified. As packet pairs with packet length and dispersion 2-tuple ($L_m,\Delta_m$) which pass the test above are identified, they are added to the set M of valid packet pairs. The packet pair in this set yielding the maximum narrow link capacity estimate will be selected as the RFBE estimate for effective bandwidth:

$$EB = \max_{m \in M} \frac{L_m}{\Delta_m} \quad (10)$$

Should no valid packet pair be observed, the estimate of effective bandwidth falls back to the lower bound provided by equation (6).

In order to obtain an estimate of available bandwidth (AB), equation (10) is combined with the estimate of utilization ($\rho$) given by equation (7).

$$AB = EB \cdot (1-\rho) \quad (11)$$

Figure 3:
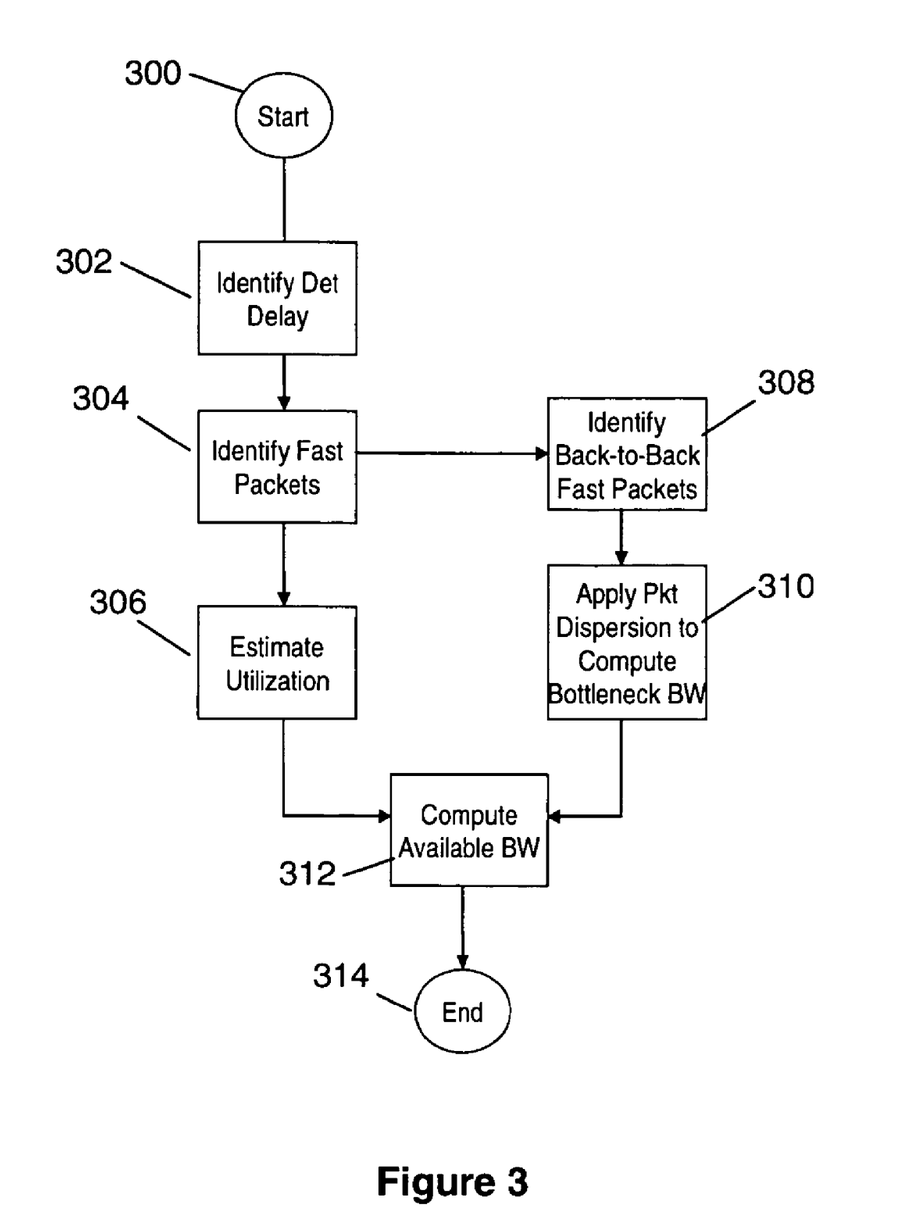
FIG. 3 is a flow diagram of a bandwidth estimation algorithm for estimating the narrow link bandwidth and available bandwidth in a path in a network.

FIG. 3 is a flow diagram of a bandwidth estimation algorithm useful for practicing the present invention. The algorithm relies on the equations described and shown above. The algorithm starts at step 300. First, from the received packets deterministic delays are identified 302. Next, fast packets are identified 304, i.e. packets that do not undergo queuing delays. After the fast packets are identified, an estimate of the utilization is calculated 306. Also, after the fast packets are identified, back-to-back fast packets are identified 308. Packet dispersion is applied to the back-to-back fast packets identified in step 308 in order to compute the narrow link bandwidth 310. Using the estimated utilization computed in step 306 and the effective bandwidth computed in step 310, the available bandwidth is computed 312. The algorithm then ends 314. The computed narrow link bandwidth and available bandwidth values from the bandwidth estimation algorithm are used by the ingress bandwidth broker to control the packets injected into the either the encrypted network or the multi-hop commercial network as the case may be.

In summary, novel methods for efficient estimation of the available bandwidth for an end-to-end path have been described and illustrated. In the process of estimating available bandwidth, the methods obtain estimates of narrow link capacity and utilization of the path as well isolating the contributions of deterministic, transmission and queuing delays to total end-to-end delay. The methods also provide robustness to the effects of clock offset. The methods described and illustrated are applicable to both a wireless battlefield network context and also to wired or wireless commercial networks.

The methods here have been demonstrated to be effective by simulation for network paths comprising work-conserving serial links (i.e., packets may be queued for transmission if the transmission media is not currently transmitting another packet). This represents an important class of transmission scheme and encompasses many types of wireless and wired links. For non-work-conserving links, the methods herein may not be as effective.

While there has been described and illustrated a method and systems for estimating narrow link bandwidth and available bandwidth using existing user traffic, it will be apparent to those skilled in the art that modifications and variations are possible without deviating from the teachings and broad principles of the present invention which shall be limited solely by the scope of the claims appended hereto.

We claim:

1. A non-transitory computer-readable storage medium having instructions stored thereon that, in response to a processor executing the instructions, cause the processor to perform functions including:

receiving a plurality of packets;
sorting the received plurality of packets by packet length into one or more bins, wherein at least one packet of the plurality of packets is associated with an end-to-end delay (T);
determining a queuing delay (W) for individual packets of the one or more bins based at least in part on the associated end-to-end delay of the individual packets;
identifying one or more packets of the one or more bins as one or more fast packets based at least in part on the queuing delay of the one or more fast packets; and
determining an estimated path utilization ($\rho$) based at least in part on the identified one or more fast packets.

2. The non-transitory computer-readable storage medium of claim 1, wherein identifying the one or more packets as the one or more fast packets comprises identifying each of the one or more packets as having a queuing delay of zero.

3. The non-transitory computer-readable storage medium of claim 1, wherein the functions further comprise:
determining an estimate of available bandwidth based at least in part on the estimated path utilization; and
sending the estimate of available bandwidth.

4. The non-transitory computer-readable storage medium of claim 1, wherein sorting the received plurality of packets comprises:
determining a mode of the packet lengths of the plurality of packets;
associating the mode of the packet lengths with a particular bin of the one or more bins; and
assigning a particular packet of the plurality of packets to the particular bin, in response to a determination that the packet length of the particular packet is associated with the mode associated with the particular bin.

5. The non-transitory computer-readable storage medium of claim 1, wherein determining the estimated path utilization ($\rho$) based at least in part on the identified one or more fast packets comprises:
determining a total number of the one or more fast packets;
determining a total number of packets in the plurality of packets;
determining a fraction of fast packets ($p_{fast}$) based at least in part on the total number of the one or more fast packets and the total number of packets; and
determining the estimated path utilization ($\rho$) as: $\rho = 1 - p_{fast}$.

6. The non-transitory computer-readable storage medium of claim 1, wherein identifying the one or more packets as the one or more fast packets comprises:
determining that the total end-to-end delay (T) for a particular fast packet of the one or more fast packets minus a total end-to-end deterministic delay (D) for the particular fast packet divided by an end-to-end transmission delay for the particular fast packet ($\beta * L$) is approximately one.

7. An apparatus, comprising:
a traffic sensor configured to receive a plurality of packets; and
a bandwidth estimator configured to perform functions comprising:
sorting the received plurality of packets by packet length into one or more bins, wherein at least one packet of the plurality of packets is associated with an end-to-end delay (T);
determining a queuing delay (W) for individual packets in the one or more bins based at least in part on the associated end-to-end delay of the individual packets;
identifying one or more packets in at least one bin of the one or more bins as one or more fast packets based at least in part on the queuing delay of the one or more fast packets; and
determining an estimated path utilization ($\rho$) based at least in part on the identified one or more fast packets.

8. The apparatus of claim 7, wherein identifying the one or more packets as the one or more fast packets comprises identifying each of the one or more packets as having a queuing delay of zero.

9. The apparatus of claim 7, wherein sorting the received plurality of packets comprises:
determining a mode of the packet lengths of the plurality of packets;
associating the mode of the packet length with a particular bin of the one or more bins; and
assigning a particular packet of the plurality of packets to the particular bin, in response to a determination that the packet length of the particular packet is associated with the mode associated with the particular bin.

10. The apparatus of claim 7, wherein the functions further comprise:
determining an estimate of available bandwidth based at least in part on the estimated path utilization; and
sending the estimate of available bandwidth.

11. The apparatus of claim 7, wherein determining the estimated path utilization ($\rho$) based at least in part on the identified one or more fast packets comprises:
determining a total number of the one or more fast packets;
determining a total number of packets in the plurality of packets;
determining a fraction of fast packets ($p_{fast}$) based at least in part on the total number of the one or more fast packets and the total number of packets; and
determining the estimated path utilization ($\rho$) as: $\rho = 1 - p_{fast}$.

12. A non-transitory computer-readable storage medium having instructions stored thereon that, in response to a processor executing the instructions, cause the processor to perform functions including:
receiving a plurality of packets, wherein each packet of the plurality of packets has a packet length and an ingress time;
determining that two of the plurality of packets are a packet pair by:
determining that packet lengths of the two of the plurality of packets are a same packet length (L),
determining a difference in ingress times ($\Delta$) between each of the two of the plurality of packets, and
responsive to the difference being less than a threshold and that the packet lengths of the two of the plurality of packets are the same packet length, determining the two of the plurality of packets are a packet pair;
determining that the packet pair is a valid packet pair based at least in part on an end-to-end delay ($T_1$) for a lead packet of the packet pair; and
determining a capacity (C) of a link based at least in part on the difference in ingress times ($\Delta$) and the same packet length (L) of the two packets of the valid packet pair.

13. The non-transitory computer-readable storage medium of claim 12, wherein determining the capacity (C) comprises dividing the same packet length (L) by the difference in ingress times ($\Delta$).

14. The non-transitory computer-readable storage medium of claim 12, wherein determining that the packet pair is the valid packet pair comprises determining that the total end-to-end delay ($T_1$) for the lead packet minus a total end-to-end deterministic delay (D) for the lead packet divided by an end-to-end transmission delay for the lead packet ($\beta$*L) is approximately one.

15. The non-transitory computer-readable storage medium of claim 14, wherein determining that the total end-to-end delay ($T_1$) for the lead packet minus the total end-to-end deterministic delay (D) for the lead packet divided by the end-to-end transmission delay for the lead packet ($\beta$*L) is approximately one comprises determining that $(T_1-D)/(\beta*L) < (1+\epsilon)$, where $\epsilon$ is greater than 0.

16. The non-transitory computer-readable storage medium of claim 15, wherein $\epsilon$ is 0.1.

17. The non-transitory computer-readable storage medium of claim 12, wherein the functions further comprise:
determining that the packet pair is not a valid packet pair by determining that the total end-to-end delay ($T_1$) for the lead packet minus a total end-to-end deterministic delay (D) for the lead packet divided by an end-to-end transmission delay for the lead packet ($\beta$*L) is greater than or equal to $(1+\epsilon)$, where $\epsilon$ is greater than 0.

18. The non-transitory computer-readable storage medium of claim 12, wherein the functions further comprise:
identifying a packet length 2-tuple ($L_m$, $\Delta_m$) with a maximum capacity over a set of valid packet pairs (M), wherein the set of valid packet pairs (M) comprises the valid packet pair.

19. The non-transitory computer-readable storage medium of claim 18, wherein the functions further comprise:
determining an effective bandwidth estimate (EB) based at least in part on the packet length 2-tuple ($L_m$, $\Delta_m$) with the maximum capacity.

20. The non-transitory computer-readable storage medium of claim 19, wherein determining the effective bandwidth estimate (EB) comprises dividing a maximum-capacity length ($L_m$) by a maximum-capacity difference in ingress times ($\Delta_m$).

21. A method, comprising:
receiving a plurality of packets at a device;
sorting the received plurality of packets by packet length into one or more bins, wherein at least one packet of the plurality of packets is associated with an end-to-end delay (T) using the device;
determining a queuing delay (W) for individual packets of the one or more bins based at least in part on the associated end-to-end delay of the individual packets using the device;
identifying one or more packets of the one or more bins as one or more fast packets based at least in part on the queuing delay of the one or more fast packets using the device; and
determining an estimated path utilization ($\rho$) based at least in part on the identified one or more fast packets using the device.

22. The method of claim 21, wherein identifying the one or more packets as the one or more fast packets comprises identifying each of the one or more packets as having a queuing delay of zero.

23. The method of claim 21, further comprising:
determining an estimate of available bandwidth based at least in part on the estimated path utilization; and
sending the estimate of available bandwidth from the device.

24. The method of claim 21, wherein sorting the received plurality of packets comprises:
determining a mode of the packet lengths of the plurality of packets;
associating the mode of the packet lengths with a particular bin of the one or more bins; and
assigning a particular packet of the plurality of packets to the particular bin, in response to a determination that the packet length of the particular packet is associated with the mode associated with the particular bin.

25. The method of claim 21, wherein determining the estimated path utilization ($\rho$) based at least in part on the identified one or more fast packets comprises:
determining a total number of the one or more fast packets;
determining a total number of packets in the plurality of packets;
determining a fraction of fast packets ($p_{fast}$) based at least in part on the total number of the one or more fast packets and the total number of packets; and
determining the estimated path utilization ($\rho$) as: $\rho = 1 - p_{fast}$.

26. The method of claim 21, wherein identifying the one or more packets as the one or more fast packets comprises:
determining that the total end-to-end delay (T) for a particular fast packet of the one or more fast packets minus a total end-to-end deterministic delay (D) for the particular fast packet divided by an end-to-end transmission delay for the particular fast packet ($\beta$*L) is approximately one.

27. A method, comprising:
receiving a plurality of packets at a device, wherein each packet of the plurality of packets has a packet length and an ingress time;
using the device, determining that two of the plurality of packets are a packet pair by:
determining that packet lengths of the two of the plurality of packets are a same packet length (L),
determining a difference in ingress times ($\Delta$) between each of the two of the plurality of packets, and
responsive to the difference being less than a threshold and that the packet lengths of the two of the plurality of packets are the same packet length, determining the two of the plurality of packets are a packet pair;
determining that the packet pair is a valid packet pair based at least in part on an end-to-end delay ($T_1$) for a lead packet of the packet pair using the device; and
determining a capacity (C) of a link based at least in part on the difference in ingress times ($\Delta$) and the same packet length (L) of the two packets of the valid packet pair using the device.

28. The method of claim 27, wherein determining that the packet pair is the valid packet pair comprises determining that the total end-to-end delay ($T_1$) for the lead packet minus a total end-to-end deterministic delay (D) for the lead packet divided by an end-to-end transmission delay for the lead packet ($\beta$*L) is approximately one.

29. The method of claim 27, wherein determining that the total end-to-end delay ($T_1$) for the lead packet minus the total end-to-end deterministic delay (D) for the lead packet divided by the end-to-end transmission delay for the lead packet ($\beta$*L) is approximately one comprises determining that $(T_1-D)/(\beta*L) < (1+\epsilon)$, where $\epsilon$ is greater than 0.

30. The method of claim 27, further comprising:
determining that the packet pair is not a valid packet pair by determining that the total end-to-end delay ($T_1$) for the lead packet minus a total end-to-end deterministic delay (D) for the lead packet divided by an end-to-end transmission delay for the lead packet ($\beta$*L) is greater than or equal to $(1+\epsilon)$, where $\epsilon$ is greater than 0.

31. The method of claim 27, further comprising:
identifying a packet length 2-tuple ($L_m$, $\Delta_m$) with a maximum capacity over a set of valid packet pairs (M), wherein the set of valid packet pairs (M) comprises the valid packet pair.

32. The method of claim 31, further comprising:
determining an effective bandwidth estimate (EB) based at least in part on the packet length 2-tuple ($L_m$, $\Delta_m$) with the maximum capacity.

33. An apparatus, comprising:
a traffic sensor configured to receive a plurality of packets, wherein each packet of the plurality of packets has a packet length and an ingress time; and
a bandwidth estimator configured to perform functions comprising:
  determining that two of the plurality of packets are a packet pair by:
    determining that packet lengths of the two of the plurality of packets are a same packet length (L),
    determining a difference in ingress times ($\Delta$) between each of the two of the plurality of packets, and
    responsive to the difference being less than a threshold and that the packet lengths of the two of the plurality of packets are the same packet length, determining the two of the plurality of packets are a packet pair using the device;
  determining that the packet pair is a valid packet pair based at least in part on an end-to-end delay ($T_1$) for a lead packet of the packet pair using the device; and
  determining a capacity (C) of a link based at least in part on the difference in ingress times ($\Delta$) and the same packet length (L) of the two packets of the valid packet pair using the device.

34. The apparatus of claim 33, wherein determining that the packet pair is the valid packet pair comprises determining that the total end-to-end delay ($T_1$) for the lead packet minus a total end-to-end deterministic delay (D) for the lead packet divided by an end-to-end transmission delay for the lead packet ($\beta*L$) is approximately one.

35. The apparatus of claim 33, wherein determining that the total end-to-end delay ($T_1$) for the lead packet minus the total end-to-end deterministic delay (D) for the lead packet divided by the end-to-end transmission delay for the lead packet ($\beta*L$) is approximately one comprises determining that $(T_1-D)/(\beta*L) < (1+\epsilon)$, where $\epsilon$ is greater than 0.

36. The apparatus of claim 33, wherein the functions further comprise:
determining that the packet pair is not a valid packet pair by determining that the total end-to-end delay ($T_1$) for the lead packet minus a total end-to-end deterministic delay (D) for the lead packet divided by an end-to-end transmission delay for the lead packet ($\beta*L$) is greater than or equal to $(1+\epsilon)$, where $\epsilon$ is greater than 0.

37. The apparatus of claim 33, wherein the functions further comprise:
identifying a packet length 2-tuple ($L_m$, $\Delta_m$) with a maximum capacity over a set of valid packet pairs (M), wherein the set of valid packet pairs (M) comprises the valid packet pair.

38. The apparatus of claim 37, wherein the functions further comprise:
determining an effective bandwidth estimate (EB) based at least in part on the packet length 2-tuple ($L_m$, $\Delta_m$) with the maximum capacity.

* * * * *

UNITED STATES PATENT AND TRADEMARK OFFICE
CERTIFICATE OF CORRECTION

PATENT NO. : 7,965,644 B2
APPLICATION NO. : 12/781971
DATED : June 21, 2011
INVENTOR(S) : Chang et al.

It is certified that error appears in the above-identified patent and that said Letters Patent is hereby corrected as shown below:

Column 9, line 46, in Claim 5, delete "$\rho=1-P_{fast}$." and insert -- $\rho=1-p_{fast}$. --.

Column 10, line 36, in Claim 11, delete "$\rho=1-P_{fast}$." and insert -- $\rho=1-p_{fast}$. --.

Column 12, line 18, in Claim 25, delete "$\rho=1-P_{fast}$." and insert -- $\rho=1-p_{fast}$. --.

Signed and Sealed this
Eighteenth Day of October, 2011

David J. Kappos
*Director of the United States Patent and Trademark Office*